UNITED STATES PATENT OFFICE.

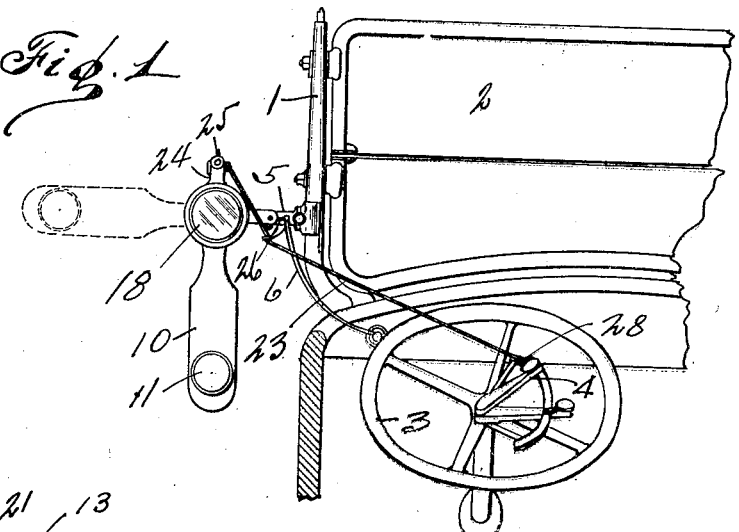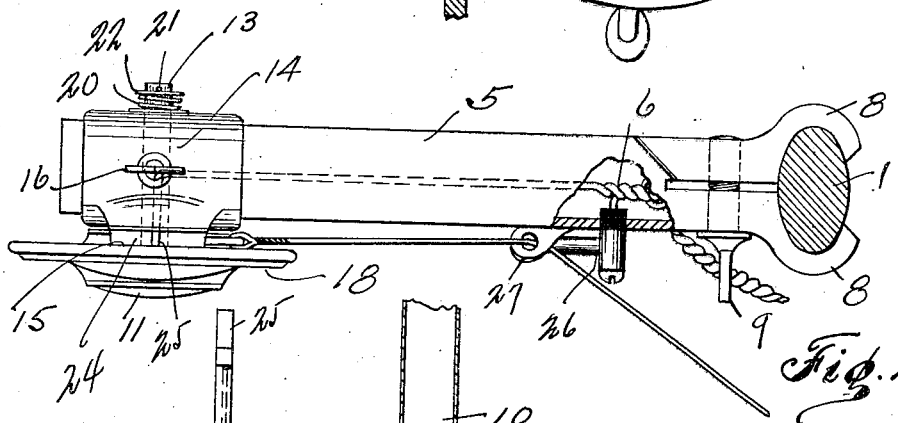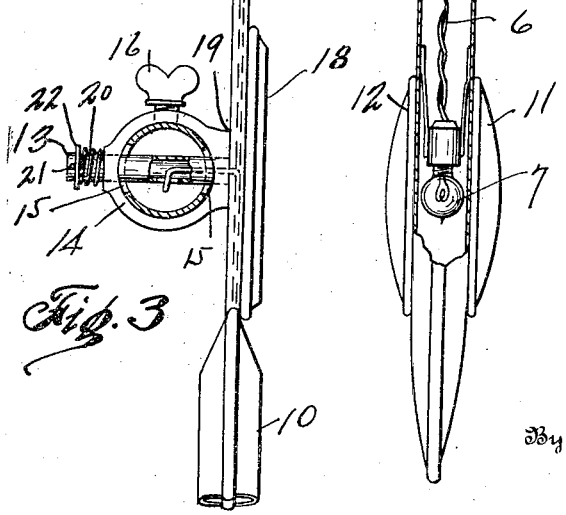

OTA FREELS, OF SPOKANE, WASHINGTON.

AUTOMOBILE-SIGNAL.

1,353,950. Specification of Letters Patent. Patented Sept. 28, 1920.

Application filed May 12, 1919. Serial No. 296,454.

*To all whom it may concern:*

Be it known that I, OTA FREELS, a citizen of the United States, residing at Spokane, in the county of Spokane and State of Washington, have invented certain new and useful Improvements in Automobile-Signals, of which the following is a specification.

The present invention relates to improvements in automobile signals, of the semaphore type and comprises a signal arm having combined therewith a signal lamp which is illuminated when the arm is moved to operative position, and certain novel combinations and arrangements of parts whereby a device simple both in construction and operation is provided at a comparatively inexpensive cost, but which is durable and efficient in performing the required functions.

In the accompanying drawings one complete example of the physical embodiment of the invention is illustrated, the parts being combined and arranged according to the best mode I have so far devised for the practical application of the principles of the invention.

The drawings illustrate the device at the front of the automobile, the signal arm and its accessories being supported from the wind shield or windshield support and the operating parts of the signal being actuated from the steering wheel accessories or devices, as for instance the spark control lever in order that the signal may be operated. Thus while driving in traffic, when a turn is to be made, it is customary to move the spark control lever to retard the spark control, giving a hotter spark and greater pulling power in the engine without the necessity for shifting the gears, and this movement of the lever is taken advantage of in the present instance for also operating the signal arm.

Referring to the drawings which form a part of the specification, and in which similar characters indicate similar parts—

Figure 1 is a view in elevation of a portion of an automobile showing the signal device attached to the windshield support or frame, the steering wheel, and connections from the spark control lever to the signal, this being an accepted form of the physical embodiment of my invention.

Fig. 2 is a top plan view of the bracket arm which supports the signal from the windshield post, showing the signal arm in vertical position and inoperative.

Fig. 3 is a transverse sectional view of the supporting or bracket arm showing the pivotal connection therewith of the signal arm.

Fig. 4 is an enlarged fragmentary view showing part of the signal arm in section and disclosing the lamp within the lenses of the signal arm.

The signal attachment may readily and with facility be applied to the standard types of automobiles by utilizing the post 1 of the windshield 2, at the left side (as here shown) of the automobile, and in connection with the steering wheel 3 and spark control lever 4, and while I have illustrated the signal device in connection with these parts it will be apparent that other combinations and arrangements may be effected for the support and operation of the signal device.

In the preferred form of the invention as illustrated in the drawings a rigid bracket arm 5 is employed, preferably of metal, and hollow to receive the wires 6 of the electric lamp 7, and the split bifurcated end of the bracket arm has a pair of clamp jaws 8, 8, and a clamp screw 9 by means of which the arm is rigidly clamped to the post of the windshield for the support of the pivoted semaphore arm or signal paddle 10.

The semaphore arm may be of metal and is preferably flat and hollow to inclose the lamp 7 and its wires 6, and near the end of the arm remote from the pivot a pair of lenses or bull's-eyes of glass are utilized, one at each side of the blades the signal as 11 and 12. These glasses or lenses may both be red, or the rear one may be red and the front one of another color, but both are of course transparent and when the lamp 7 is illuminated the usual lighting effect is produced within the glasses, as a signal.

Near its inner end, the semaphore has a fixed, rigid pivot shaft 13, which is preferably hollow to accommodate the electric light wires 6 that pass through the bracket arm, this shaft, and thence through the hollow blade of the signal arm to the lamp or bulb 7, and the hollow pivot shaft is attached by suitable means to project at right angles from the signal blade. The shaft 13 has a journal bearing in a bushing or sleeve 14, and also passes through a pair of oppositely disposed circumferential slots 15 in the bracket arm near its outer end. By means of these slots and the set screw 16 in the bushing, the bushing may be swung circumferentially around on the bracket arm and held in adjusted position by clamping or turning the screw 16 tight on the bracket. In this manner the signal blade, which carries a mirror 18 at its pivot point, may be adjusted to bring the mirror into proper focus so that the driver of the car may at a glance see, by reflection the conditions at the rear of his car.

At 19 the adjustable bushing is provided with a flat faced lug or boss against which the signal blade has a stable bearing, and by means of the coiled spring 20 on the shaft, between the bushing and a transverse pin 21 and washer 22, the blade is held in contact with the bushing to permit the blade to swing in its pivot bearings and yet at the same time hold the blade in such close frictional contact with the bearing boss as to prevent rattle or noise, or lost motion between the parts.

It will readily be apparent that the arm may be swung up to horizontal position by a pull on the cord 23, which is attached to the short arm 24 of the blade or signal semaphore, and this short arm carries a contact member 25 which, as the signal swings on its pivot to horizontal position, contacts with the fixed member 26 to complete the lighting circuit of which the lamp 7 and wires 6 form a part. Thus when the signal arm is swung to position of dotted lines in Fig. 1 the lamp will be illuminated if the switch in the circuit is closed for the purpose. During the day, the electric lighting switch may be opened and only the semaphore used, while at night the control switch of the lighting circuit may be closed, and the circuit is completed when the arm is swung to danger or signaling position.

The cord 23 may be guided through an eye or perforated ear 27 on the bracket arm, and a ring as 28 may be attached at the end of the cord to be slipped over the lever 4, and it will readily be apparent that the cord may be pulled either by moving the lever, or regardless of the lever, the cord may be pulled directly by hand to swing the signal to operative position, as for instance when a curve or corner is to be turned, or it is desired to indicate "stop" to the following traffic. The bracket arm may be adjusted as to altitude by sliding the loosened jaws 8 on the post 1 and then tightening the screw 9 in proper position, and the angularity of the blade and its mirror may be adjusted, as before stated by swinging the blade with the longitudinal axis of the bracket arm as the center to bring the mirror to proper reflecting position.

From the above description taken in connection with my drawings it is apparent that I have provided a signaling device that is simple in construction and operation, facile, and effective, and comparatively perfect in performing the functions for which it is intended.

What I claim is—

1. The combination with the supporting post, of an adjustable bracket arm having circumferential oppositely disposed slots, a bearing bushing having a set screw and mounted on the bracket arm, a signal arm provided with a pivot shaft passed through the slotted bracket arm and through said bearing bushing, and means for swinging said signal arm on its pivot as described.

2. The combination with the hollow bracket arm having circumferential oppositely disposed slots, of a bearing bushing adjustable on the arm, a signal arm having a pivot shaft passed through said slots and the bushing and provided with a mirror adjacent its pivot point, and means for swinging the signal arm as described.

In testimony whereof I affix my signature.

OTA FREELS.